(12) United States Patent
Scott

(10) Patent No.: US 9,322,631 B2
(45) Date of Patent: Apr. 26, 2016

(54) SURFACE MEASUREMENT INSTRUMENT AND CALIBRATION THEREOF

(75) Inventor: Paul J. Scott, Leicester (GB)

(73) Assignee: Taylor Hobson Limited, Leicester, Leicestershire (GB)

(*) Notice: Subject to any disclaimer, the term of this patent is extended or adjusted under 35 U.S.C. 154(b) by 743 days.

(21) Appl. No.: 13/581,900

(22) PCT Filed: Mar. 1, 2011

(86) PCT No.: PCT/GB2011/050400
§ 371 (c)(1),
(2), (4) Date: Nov. 6, 2012

(87) PCT Pub. No.: WO2011/107784
PCT Pub. Date: Sep. 9, 2011

(65) Prior Publication Data
US 2013/0054194 A1  Feb. 28, 2013

(30) Foreign Application Priority Data
Mar. 2, 2010 (GB) .................................. 1003458.5

(51) Int. Cl.
| | | |
|---|---|---|
| G01B 5/20 | (2006.01) | |
| G06F 17/11 | (2006.01) | |
| G06F 15/00 | (2006.01) | |
| G01B 5/252 | (2006.01) | |
| G01B 7/312 | (2006.01) | |

(52) U.S. Cl.
CPC .............. *G01B 5/252* (2013.01); *G01B 7/312* (2013.01)

(58) Field of Classification Search
CPC ......... G01B 5/252; G01B 7/312; G01B 21/20
USPC ................... 702/95, 150, 151, 167, 168, 169; 33/503, 504, 505, 554, 589, 564; 250/231.14; 700/279; 73/104
See application file for complete search history.

(56) References Cited

U.S. PATENT DOCUMENTS

| | | |
|---|---|---|
| 5,926,781 A | 7/1999 | Scott |
| 6,215,119 B1 | 4/2001 | Markham |
| 2001/0008994 A1 | 7/2001 | Omori |

(Continued)

FOREIGN PATENT DOCUMENTS

| | | |
|---|---|---|
| DE | 44 02 401 | 8/1995 |
| EP | 0 068 082 | 1/1983 |
| EP | 1 992 910 | 11/2008 |

(Continued)

OTHER PUBLICATIONS

International Search Report for International Application No. PCT/GB2011/050400, dated Jul. 20, 2011.

(Continued)

*Primary Examiner* — John H Le
(74) *Attorney, Agent, or Firm* — RatnerPrestia

(57) ABSTRACT

A method of calibrating a surface measurement instrument includes rotating a work piece having an undulating surface on a turntable of a metrological apparatus; measuring the surface of the work piece at a plurality of rotational positions; analyzing the results of the measurement to determine parameters describing an error causing characteristic of the metrological apparatus; and using the determined parameters to correct measurement data for the error causing characteristic of the metrological apparatus.

18 Claims, 8 Drawing Sheets

(56) References Cited

U.S. PATENT DOCUMENTS

2004/0073338 A1    4/2004    Kobi
2009/0025463 A1*    1/2009    McFarland et al. ............. 73/104

FOREIGN PATENT DOCUMENTS

| FR | 2 921 476 | 3/2009 |
|----|-----------|--------|
| GB | 2 189 604 | 10/1987 |
| GB | 2 294 327 | 4/1996 |
| JP | 60238258 | 11/1985 |
| JP | 2007178320 | 7/2007 |
| JP | 2009300366 | 12/2009 |

OTHER PUBLICATIONS

Great Britain Search Report for GB Application No. GB1003458.5, dated May 20, 2010.

* cited by examiner

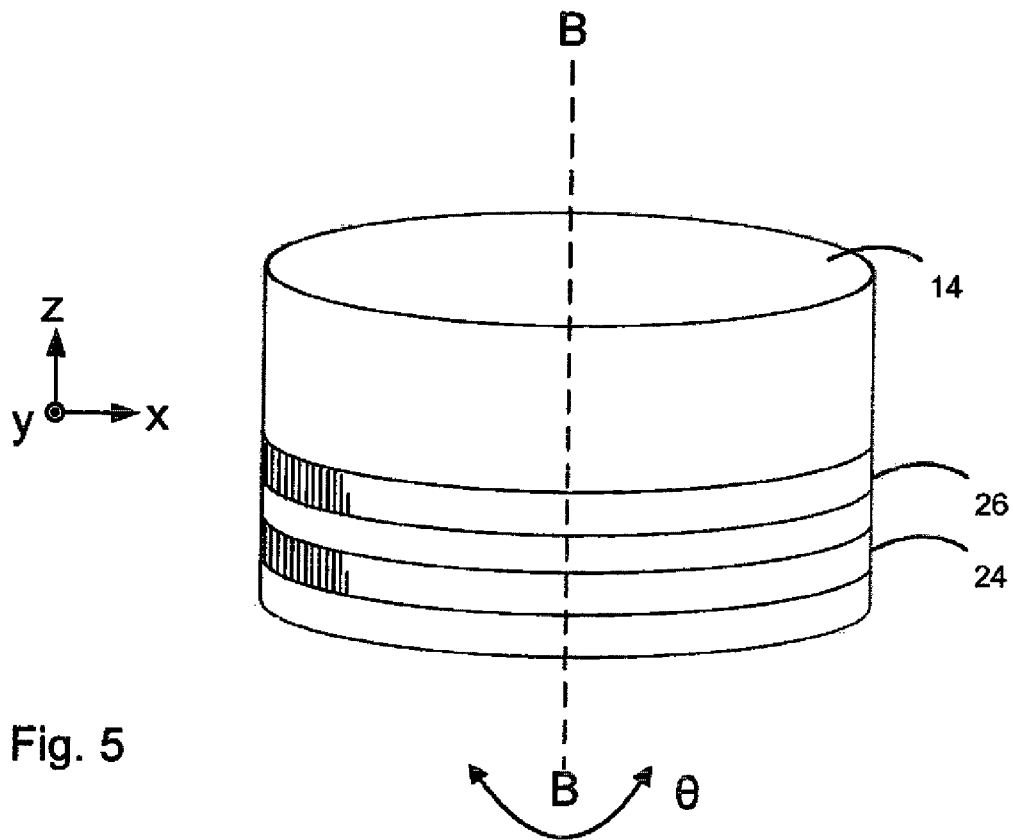
Fig. 5
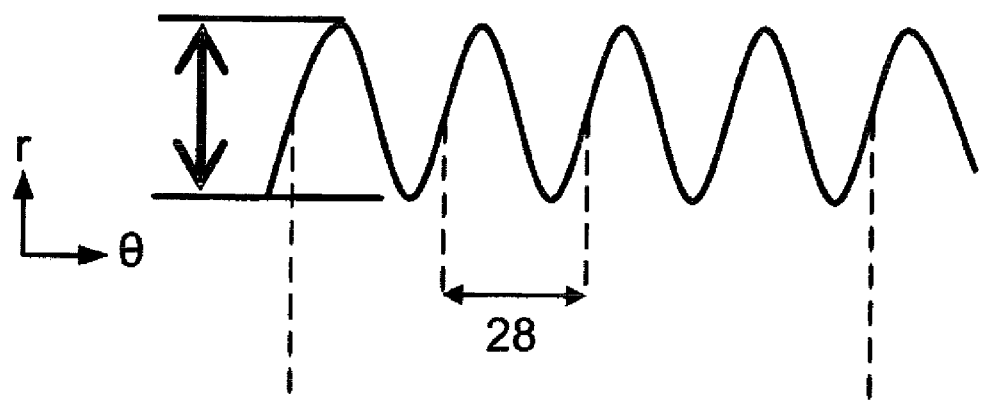
Fig. 6   θ = 0   θ = 2π

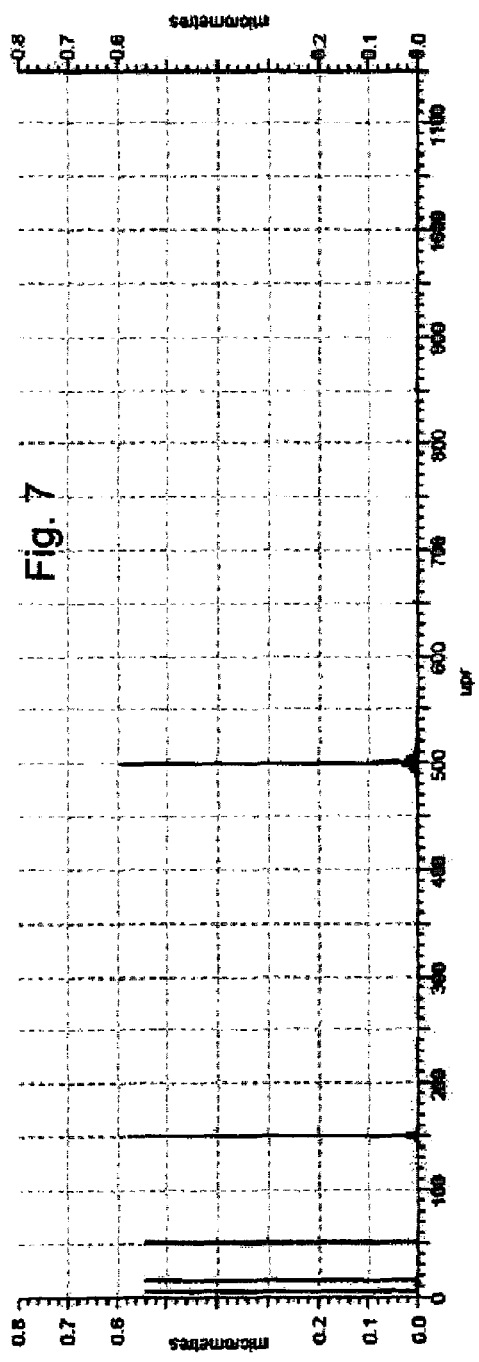

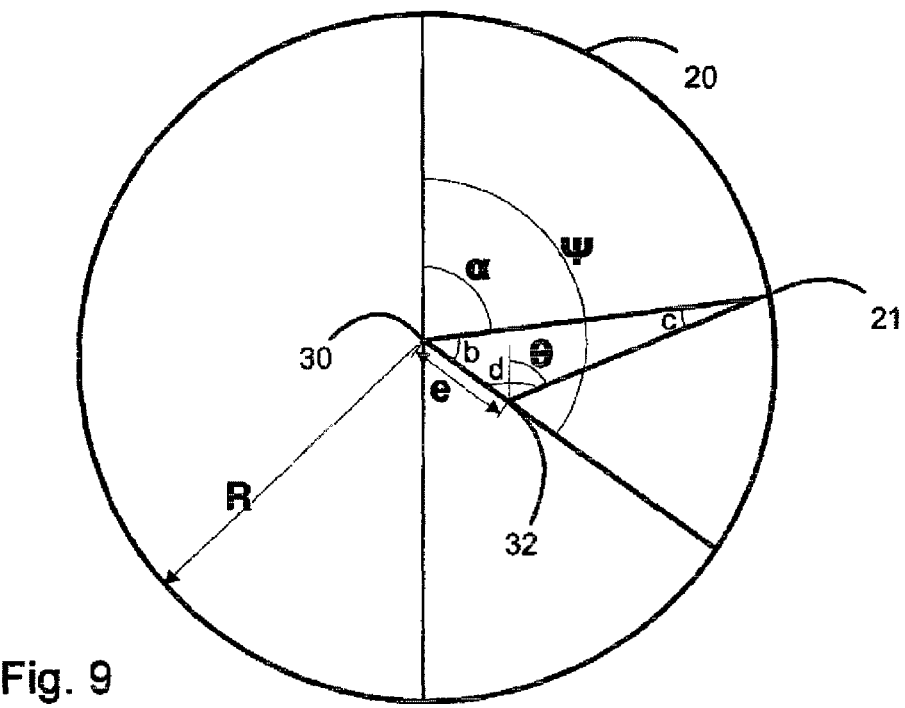
Fig. 9
Fig. 11
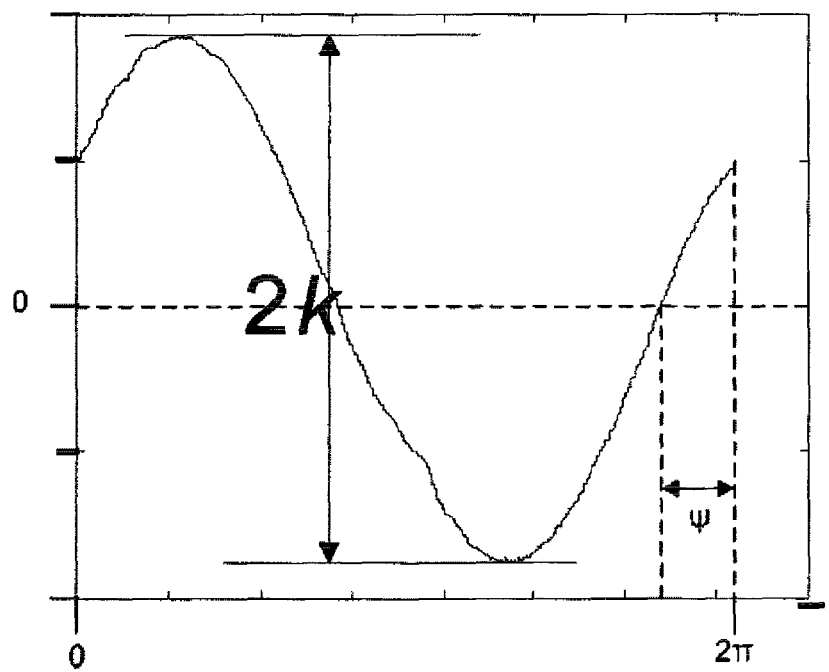

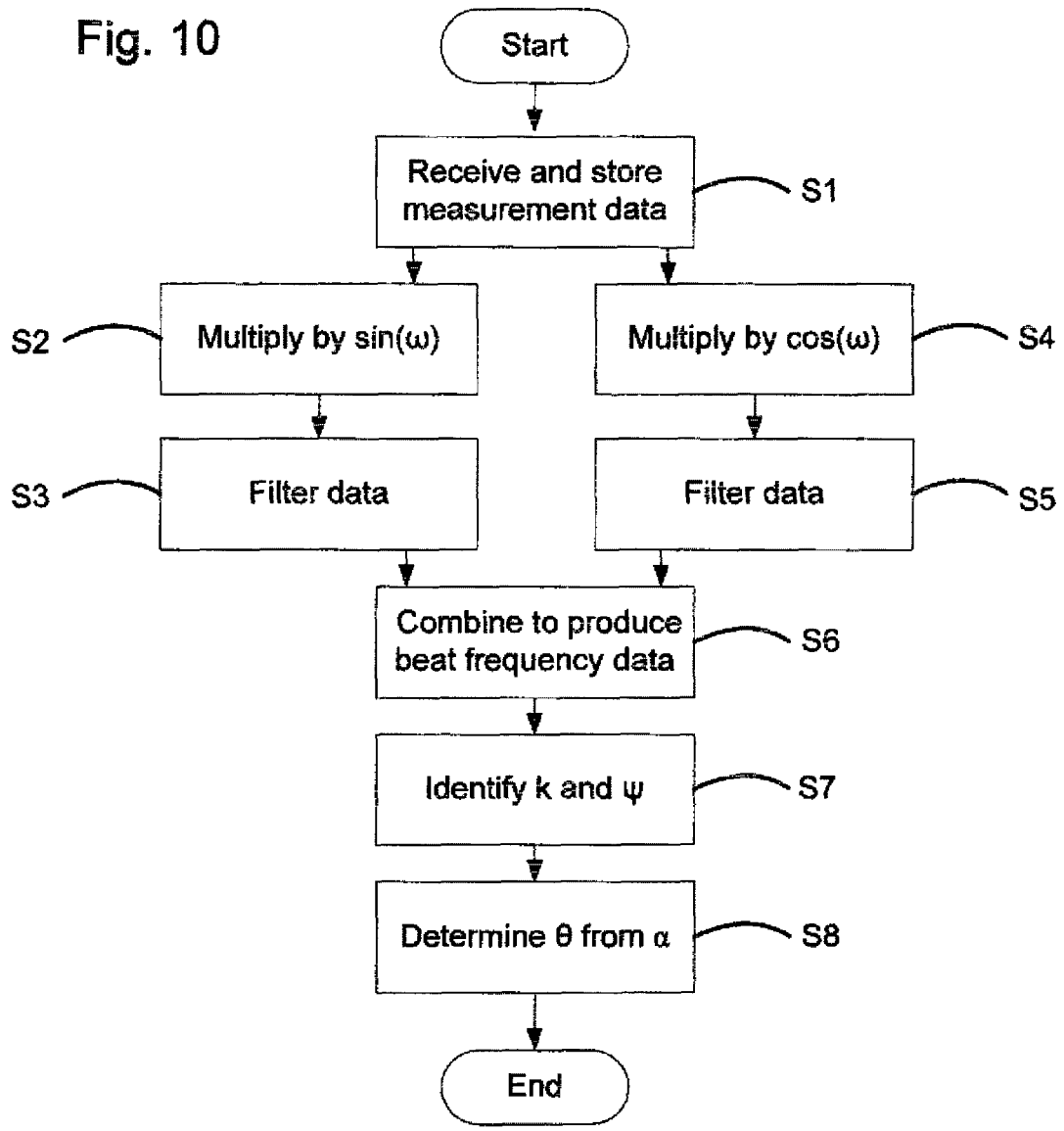

SURFACE MEASUREMENT INSTRUMENT AND CALIBRATION THEREOF

This invention relates to a surface measurement instrument for measuring one or more surface characteristics and a method of calibrating the instrument.

Taylor Hobson Limited, a division of Ametek Inc., manufactures a number of roundness measuring metrological instruments which use a measurement probe to determine the roundness of surfaces—one type of such a metrological instrument manufactured by Taylor Hobson is the Talyrond (Registered Trade Mark) series. In many of these instruments, a mechanical stylus is employed and relative rotational movement is effected between the stylus and a component by rotating a turntable upon which the component is placed so that surface changes in the radial direction cause an arm carrying the stylus to move as the stylus follows these surface changes. Surface changes in the radial direction are then determined by measuring displacement of the arm and rotational movement of the component relative to the stylus is recorded using a rotary encoder having a measurement axis that is preferably coaxial with the axis of rotation of the turntable.

If the measurement axis of the rotary encoder is not coaxial with the axis of rotation of the turntable then this eccentricity introduces measurement errors as the recorded rotational positions differ to the actual rotational positions. Eccentricity of a rotary encoder relative to the axis of rotation of the turntable may be corrected by providing the metrological instrument with means for mechanically adjusting the position of the rotary encoder relative to the turntable and repeating a time consuming measurement-correction procedure, or by using a rotary encoder that has a pair of read heads spaced apart by 180° and averaging the readings from the two read heads.

In one aspect, the present invention provides a method of and apparatus for characterising the eccentricity of a rotary encoder of a surface measurement instrument. Relative rotation of a work piece support that supports an artefact having an undulating profile and a measurement probe is effected about a rotation axis, for example an axis of rotation of a turntable. The rotation is logged about a measurement axis of the rotary encoder using a rotary encoder. The undulating profile of the artefact is measured at a plurality of the consequent rotational positions using the measurement probe and the results of these measurements are processed to produce parameters characterising the eccentricity of the measurement An embodiment provides a method of characterising the eccentricity of a rotary encoder with respect to a turntable of a surface measurement instrument, the method comprising: rotating a turntable carrying an artefact having an undulating profile about a rotation axis of the turntable; using a rotary encoder to log rotation of the turntable about a measurement axis of the rotary encoder; measuring the undulating profile of the artefact at a plurality of rotational positions of the turntable using a measurement probe to produce profile measurement data; and extracting from the profile measurement data parameters describing the eccentricity of the measurement axis of the rotary encoder with respect to the rotation axis of the turntable.

In one aspect, the present invention provides a method of and apparatus for correcting for the eccentricity of a rotary encoder. Parameters relating angles measured about an axis of measurement of a rotary encoder to angles measured about a rotation axis of a surface measurement instrument are received and used to calculate, for angles measured about the measurement axis of the rotary encoder, corresponding angles measured about the rotation axis.

Advantageously, these approaches can be implemented in software and so do not require physical modification of the metrological instrument—as would be required if mechanical adjustment means were employed or if a second read head was required for the rotary encoder. This allows metrological instruments to be calibrated very cheaply and also enables existing instruments to be retro-corrected simply by way of a software update and a single measurement operation performed on an undulating work piece.

Embodiments of the present invention will now be described, by way of example, with reference to the accompanying drawings, in which:

FIG. 5 shows a perspective view of a multiwave standard;

FIG. 6 shows a measurement trace created from measuring the standard of FIG. 5;

FIG. 7 shows a theoretical frequency domain representation of a measurement performed on a multiwave standard;

FIG. 8 shows a measured frequency domain representation of a measurement performed on the same multiwave standard as for FIG. 7;

FIG. 9 shows an exaggerated diagrammatic representation of the eccentricity of an encoding disc with respect to the axis of rotation of a turntable;

FIG. 10 shows a flow chart illustrating steps carried out by the control apparatus to characterise the eccentricity of an encoder; and FIG. 11 shows a plot of a sinusoid characterising the eccentricity of an encoder disc.

Figure 1:
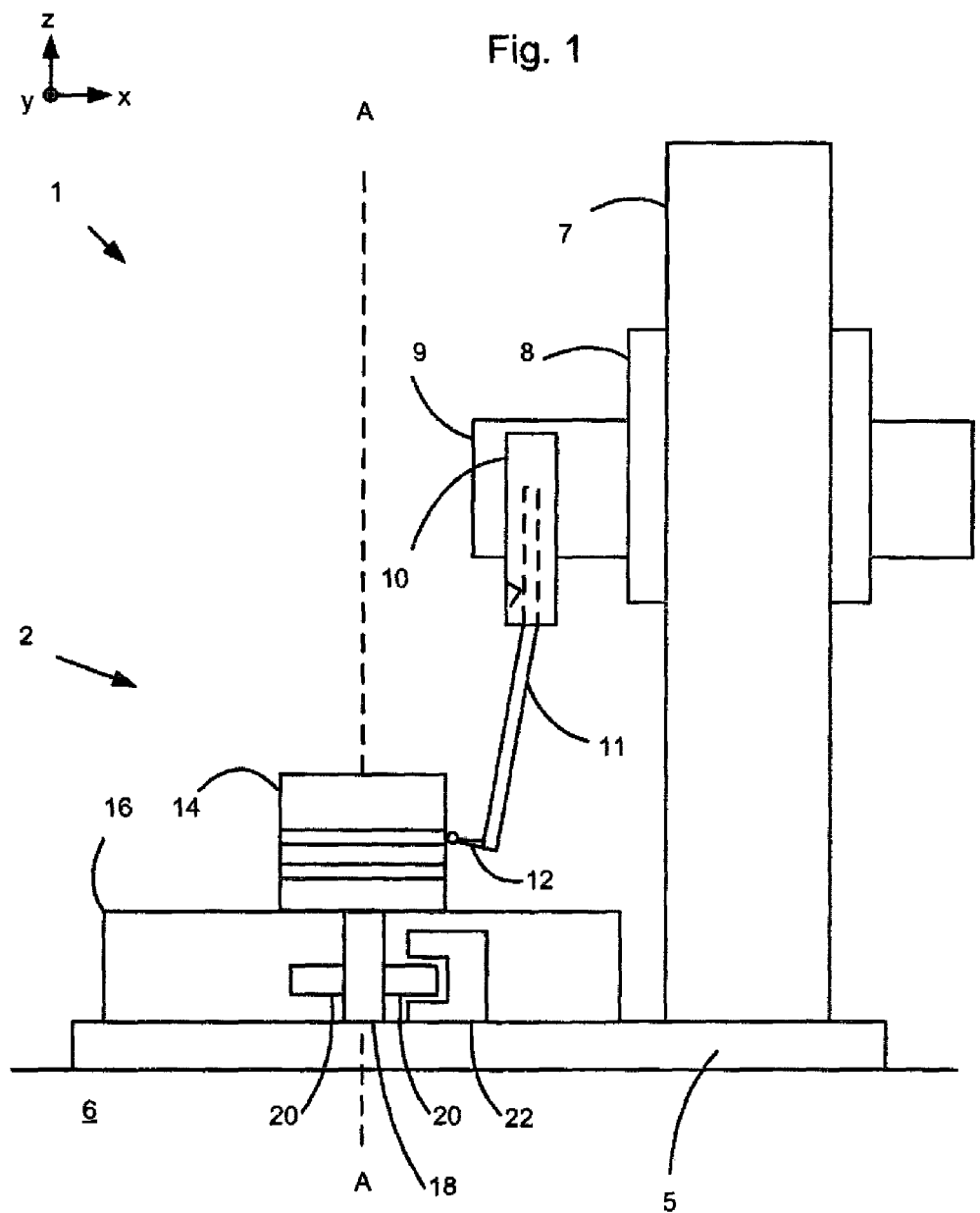
FIG. 1 shows a very schematic representation of a metrological instrument embodying the present invention looking in a direction perpendicular to a measurement direction.

With reference to the drawings in general, it will be appreciated that the Figures are not to scale and that, for example, relative dimensions may have been altered in the interest of clarity in the drawings. Also, any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Overview

Referring now to the drawings, an example metrological instrument will be described which comprises a metrological apparatus and a control apparatus.

Figure 2:
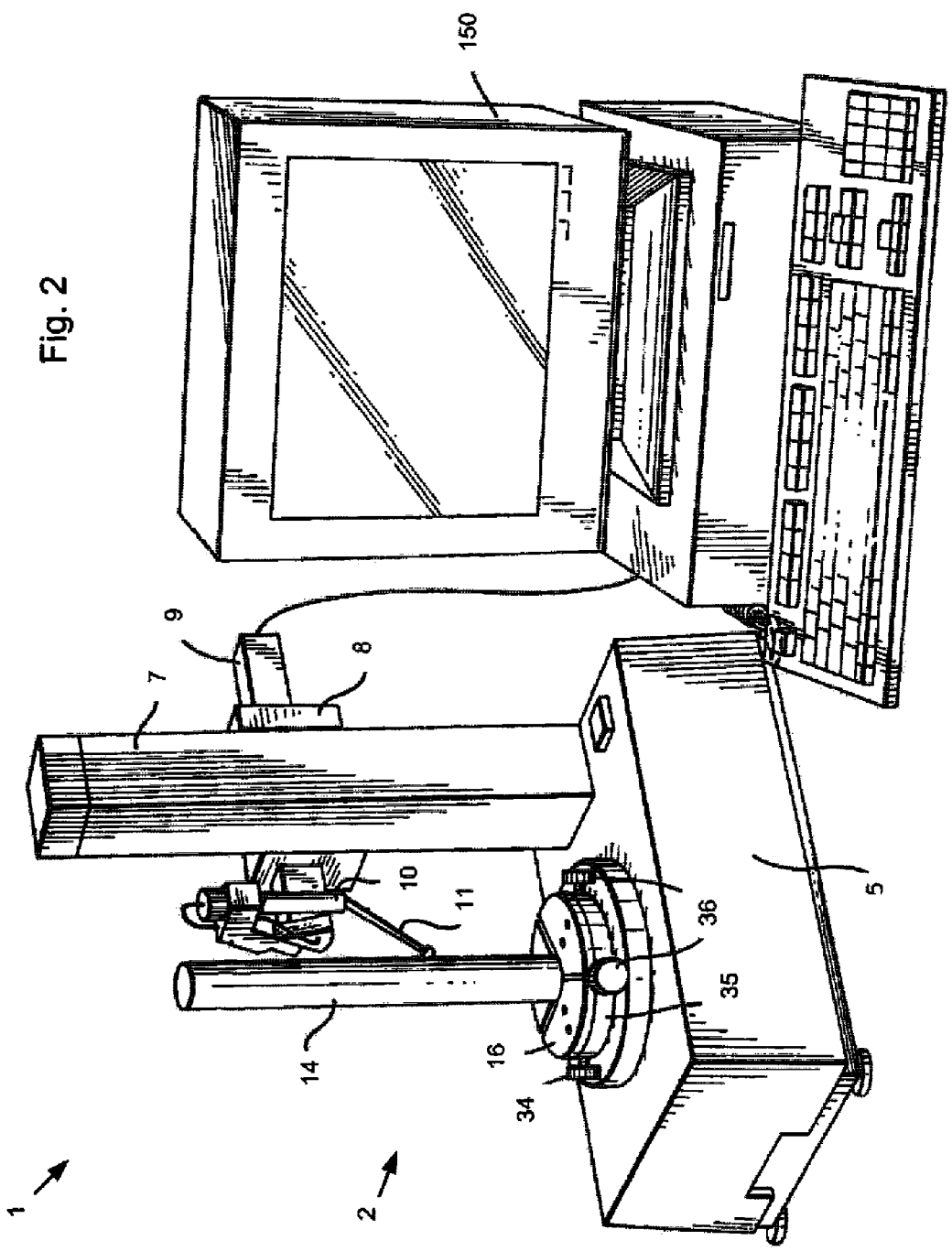
FIG. 2 shows a diagrammatic perspective representation of a metrological instrument embodying the present invention.

FIGS. 1 and 2 show diagrammatic representations of a metrological apparatus 2 of the metrological instrument 1 with FIG. 1 looking generally in a y direction (that is the direction perpendicular to a radial measurement or r direction) and FIG. 2 being a perspective view. It will be appreciated that neither FIG. 1 nor FIG. 2 is not to scale.

The metrological apparatus 2 has a base 5 that is designed to be supported by a workbench 6. The base 5 carries a column 7 that defines a vertical or z axis reference datum. A column carriage 8 is mounted to the column 7 so as to be movable in the z direction with respect to the column 7. The movement of the column carriage 8 is effected by a motorised leadscrew, pulley or other drive arrangement (not shown). The base 5 also carries turntable 16 to support a waviness standard 14. The turntable 16 shown in FIG. 2 has a centring and levelling mechanism 34, 35, 36 for manually centring and levelling the turntable—however an automated mechanism, such as that shown in FIGS. 2 and 3 of GB 2,189,604A, the whole contents of which are hereby incorporated by reference could equally be employed. The turntable 16 also has an axle 18 (shown in partial cross section in FIG. 1) about which the turntable 16 is rotatable and a rotary encoder 20, 22 (shown in partial cross section in FIG. 1) for recording the rotary position of the turntable. In the example shown in FIG. 1, the rotary encoder 20, 22 comprises a glass encoding disc 20 coupled to the axle 18 and having a series of transparent and opaque areas respectively for allowing and impeding the passage of light and a photocoupler 22 coupled to the base 5 and comprising a light source and a photo detector arranged to detect whether the glass encoding disc 20 is in a rotational position that impedes the passage of light or not. When the encoding disc 20 is rotated relative to the photocoupler 22, the photocoupler 22 produces a pulsed signal from which the relative rotational position of the encoding disc 20 about its measurement axis may be determined.

The column carriage 8 carries a measurement probe carriage 9, which is movable relative to the column carriage 8 in the r direction by means of a motorised drive arrangement (not shown).

The measurement probe carriage 9 carries a measurement probe (or gauge unit) 10 which, in this embodiment, consists of a pivotally mounted stylus arm (shown very diagrammatically in FIG. 1 in dotted lines within the measurement probe carriage 9) coupled to a linear variable differential transformer (LVDT) at one end and carrying at its free end a stylus arm 11 having a stylus tip 12 which in operation comes into contact with the surface of the work piece or component under test so that, as the measurement probe carriage 9 is moved in the measurement direction, the stylus arm 11 pivots to enable the stylus tip 12 to follow variations in the r direction along a measurement path on the surface.

Control Apparatus

Figure 3:
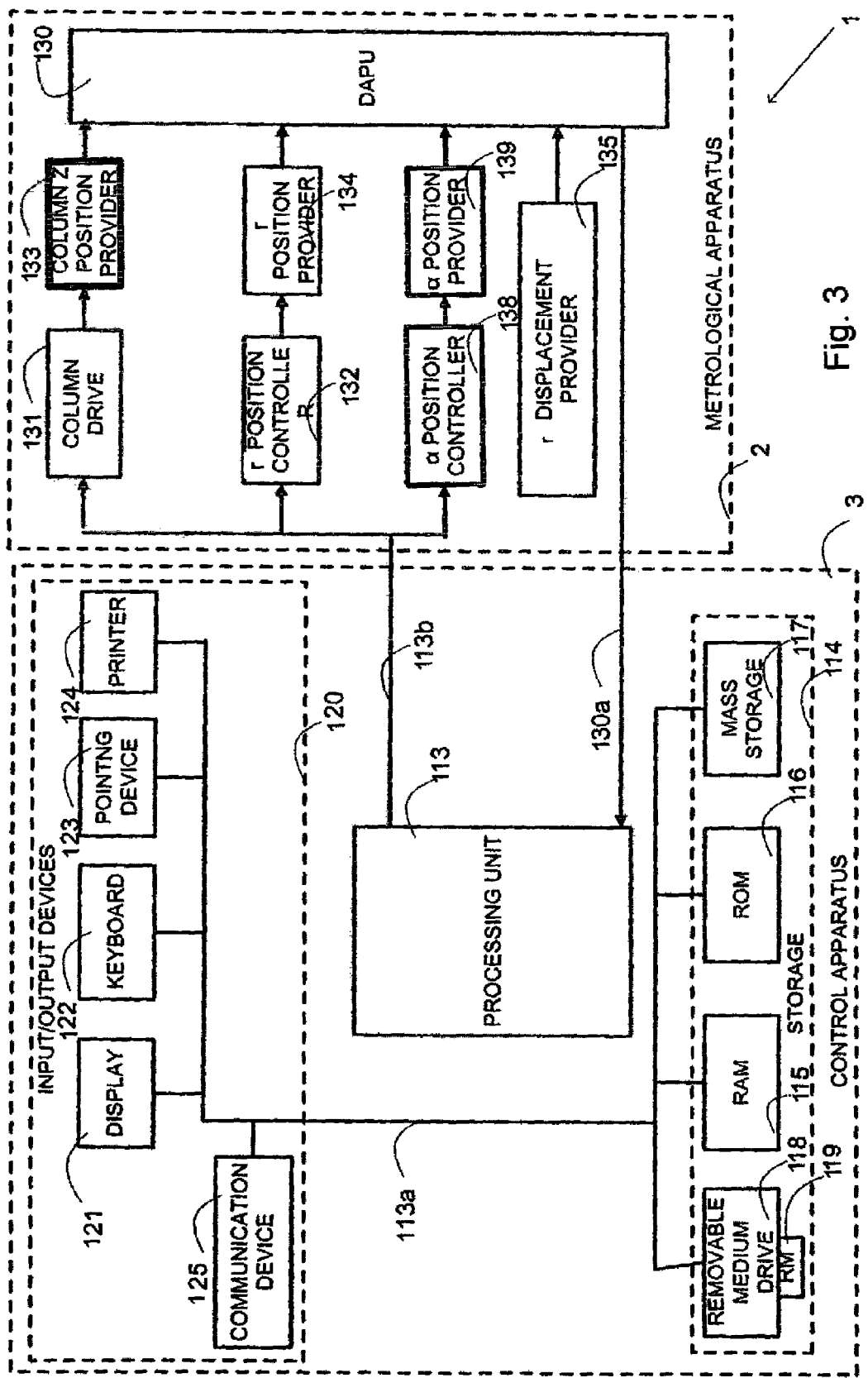
FIG. 3 shows a block diagram of functional components of a measuring apparatus.
Figure 4:
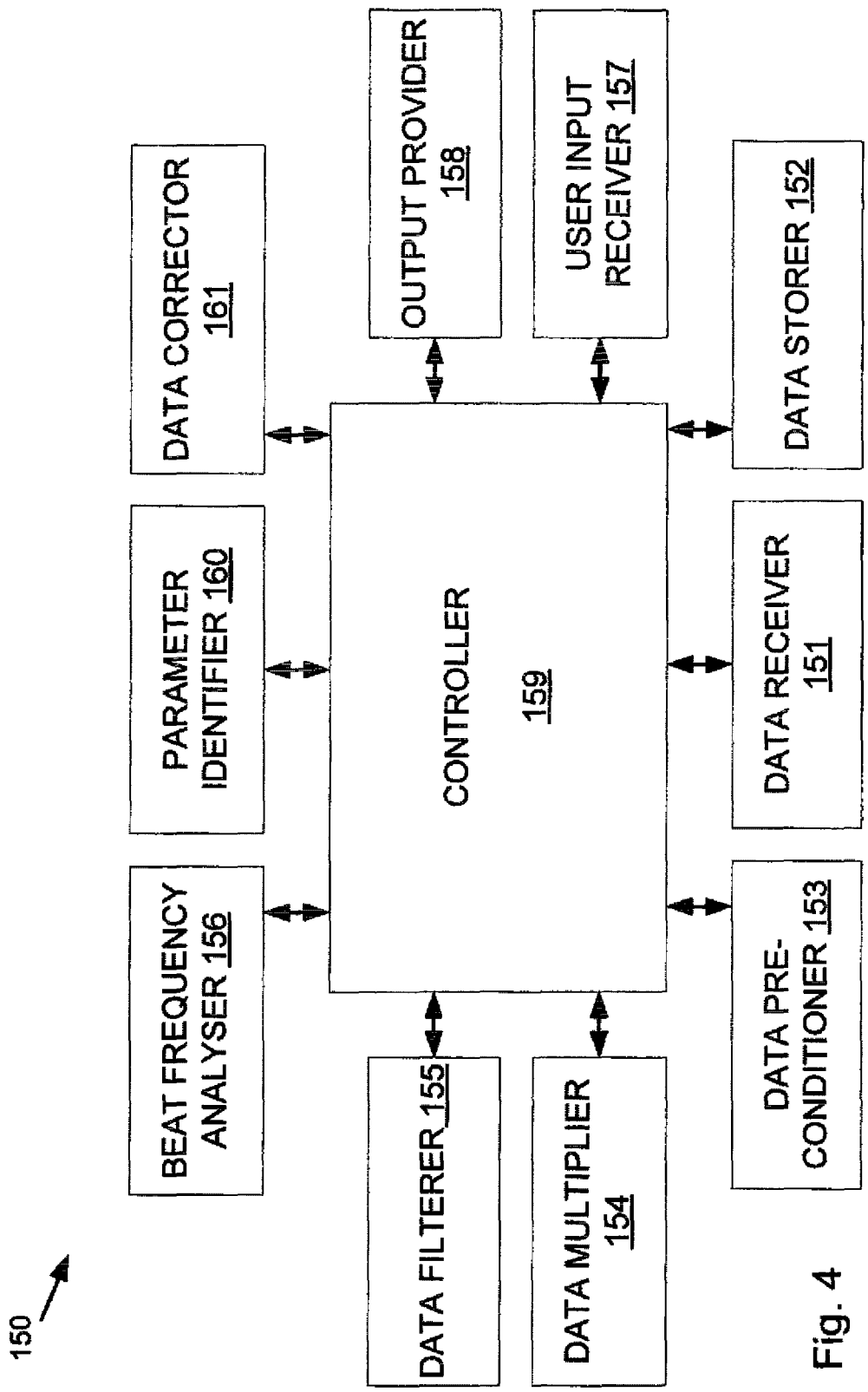
FIG. 4 shows a block diagram of functional components provided by programming of the processing unit of FIG. 3.

FIG. 3 shows a block diagram illustrating the main functional components of both the metrological apparatus 2 and the control apparatus 3 of the metrological instrument 1 while FIG. 4 shows a block diagram of functional components provided by programming of the control apparatus 3.

Referring now to FIG. 3, the control apparatus 3 is generally a personal computer and has a processing unit 113 coupled via a bus 113a to associated data and program instruction/software storage 114 in the form of RAM 115, ROM 116, a mass storage device 117 such as a hard disc drive and at least one removable medium drive 118 for receiving a removable medium (RM) 119, such as a CD-ROM, solid state memory card, DVD, or floppy disc. As another possibility, the removable medium drive may itself be removable, for example it may be an external hard disc drive.

The control apparatus is also coupled via the same or a different bus to input/output devices 120 comprising a display 121, a keyboard 122, a pointing device 123 such as a mouse, a printer 124 and, optionally, a communications device 125 such as at least one of a MODEM and a network card for enabling the control apparatus 3 to communicate signals S via a wired or wireless connection with other control apparatus or computers via a network such as the Internet, an intranet, a WAN or a LAN.

The processing unit 113 is programmed by program instructions and data provided by being at least one of: downloaded as a signal S via the communications device 125; pre-stored in any one or more of ROM 116, RAM 115 and mass storage device 117; read from a removable storage medium 119 received by the removable medium drive 118; and input by the user using the keyboard 122.

The metrological apparatus 2 has a data acquisition and processing unit (DAPU) 130 that communicates with the processing unit 113 of the control apparatus 3 via an appropriate link, for example a serial link, 130a to enable data regarding a measurement operation to be communicated to the control apparatus 3.

The control components of the metrological apparatus 2 may comprise a column drive controller 131 for driving the carriage 8 up and down the column in the z direction, an r position controller 132 for driving the measurement probe carriage 9 in the radial direction, an a (where a represents the angle of rotation of the turntable 16 about its spindle axis) position controller 138 for controlling rotation of the turntable 16, and an r displacement provider 135 for providing a measure of the r displacement of the stylus tip 12 as the stylus arm 11 follows the surface being measured during movement of the waviness standard 14 by rotation of the turntable 16. An a position provider 139 (in this case rotary encoder 20, 22) is provided to supply a signal indicating the angle α to the DAPU 130. Generally the r displacement provider 135 will be provided within the measurement probe carriage 9.

The position controller r may be associated with an r position provider 134 for indicating the position of the measurement probe carriage 9 with respect to the column 7, for example a shaft encoder associated with a motor providing the r position controller 132 or a linear grating type of transducer, or the r position may be determined in an open loop manner directly from the position controller drive signal. The column drive 131 may also be associated with a column z position provider 133, for example a shaft encoder associated with a motor providing the column drive 131, or the column z position may be determined in an open loop manner directly from the column motor drive signal. As show in FIG. 3, the column drive 131 and r position controller 132 (and other controllers if present) are coupled to the control apparatus 3 (via a link 113b and appropriate interfaces, not shown) for control by instructions from the control apparatus 3. At least some of these instructions may be supplied by the user.

The processing unit is programmed by program instructions to enable carrying out of measurements. FIG. 4 illustrates the functionality that may be provided by such programming In the example shown in FIG. 4, programming of the processing unit 113 provides a data processor 150 comprising: a data receiver 151 for receiving data from the metrological instrument 2, a data storer 152 for storing data; a data pre-conditioner 153 for filtering received data to eliminate noise and other unwanted variations; a data multiplier 154 for multiplying data by sine and cosine functions; a data falterer 155 for filtering data using, in this example, a low pass filter; a beat frequency analyser 156 for analysing beat frequency information; a parameter identifier 160 for identifying parameters describing the eccentricity of the rotary encoder 20, 22; and a data corrector 161 for correcting measured data. The data processor 150 also comprises a user input receiver 157 for receiving user input from the keyboard 122 or pointing device 123 and an output provider 158 for providing output data to at least one of the display 121, the printer 124 and the communications device 125, if present. The data processor 150 further comprises a controller 159 for controlling overall operation of the data processor.

Waviness Standard

FIG. 5 shows a diagrammatic representation of a waviness standard 14. The waviness standard 14 is cylindrical with an axis of symmetry B-B and has a plurality of bands 24, 26 about its periphery. Each of the plurality of bands 24, 26 comprises a series of radial undulations superposed on a circular cross section of the waviness standard 14 and arranged so that when the waviness standard 14 is rotated about its axis of symmetry B-B, and a measurement probe measures the radial profile of the band, an undulating signal is recorded. FIG. 6 shows an example profile measured in a radial direction to the band 26 in which the undulations are sinusoidal. Reference numeral 28 indicates a single undulation of the band 26. For the example of FIG. 6, when the waviness standard 14 is rotated about its axis of symmetry B-B by an angle of $2\pi$ and the profile of the band 26 is measured in a direction radial to the axis B-B, four complete sinusoidal cycles will be recorded and the band would be said to have undulations at a frequency of 4 undulations per revolution (4 upr). Band 24 of the waviness standard 14 comprises five superposed series of undulations, each series of undulations having a different number of sinusoidal undulations per rotation (upr) of the waviness standard 14. The five series of undulations of band 24 have respectively 1 upr, 15 upr, 50 upr, 150 upr and 500 upr. FIG. 7 shows a theoretical frequency domain representation of the undulating signal that should be recorded when a measurement probe measures the radial profile of band 24 whilst the waviness standard 14 is rotated. The representation of FIG. 7 has a spike at the upr frequency of each of the five series of undulations of band 24.

FIG. 8 shows a frequency domain representation of the undulating signal as recorded by the metrological instrument 1 when the waviness standard 14 was centred on the turntable 16 and the radial profile of band 24 was measured by measurement probe 10 during rotation of the turntable 16. As can be seen most notably around the 500 upr frequency of FIG. 8, the measured undulating signal differs from the theoretical signal in that there is a frequency spread around each of the spikes.

Encoder Eccentricity

As will now be explained, the inventor has determined that the difference between the theoretical signal and the measured signal is due to eccentricity of the rotary encoder 20, 22 with respect to the axis of rotation A-A of the turntable 16.

FIG. 9 shows an exaggerated diagrammatic representation of the encoding disc 20 of the rotary encoder 20, 22. The measurement axis of the rotary encoder passes through the centre of the encoding disc 20 at position 30 and the photocoupler 22 reads whether light may pass through the encoding disc 20 at a position 21 that is a radial distance R away from the measurement axis of the rotary encoder. In the example of FIG. 9, the axis of rotation A-A of the turntable 16 passes through the encoding disc 20 at position 32 which is at a radial distance e and at an angle $\psi$ from the measurement axis of the rotary encoder. Accordingly, when the turntable 16 is at an angle $\theta$ with respect to a predefined zero angle, the rotary encoder 20, 22 will measure that the turntable 16 is instead at an angle $\alpha$. The triangle of FIG. 9 that joins positions 21, 30, and 32 has internal angles b, c, and d that respectively equal $\psi-\alpha$, $\alpha-\theta$, and $180-\psi+\theta$. Applying the sine rule to the triangle of FIG. 9, the relationship between angles $\theta$ and $\alpha$ can be found as follows:

$$\frac{\sin(180-\psi+\theta)}{R} = \frac{\sin(\alpha-\theta)}{e}$$

$$\frac{e}{R}\sin(\psi-\theta) = \sin(\alpha-\theta)$$

if e is small, $\alpha-\theta$ is small and so $\sin(\alpha-\theta) \approx \alpha-\theta$ $$\alpha - \theta = \frac{e}{R}\sin(\psi-\theta)$$

$$\alpha = \theta + \frac{e}{R}\sin(\psi-\theta)$$

$$a = \theta - k\ \sin(\theta-\psi)$$

where k=e/R and k is small. Therefore, if a multiwave standard waviness standard 14 is centred on the axis of rotation A-A of a measurement instrument 1 in which the encoding disc's measurement axis B-B is eccentric to the axis of rotation A-A of the turntable 16, and radial measurements are taken of a band 24, 26 having a series of sinusoidal undulations whilst the turntable 16 is rotated by a single revolution, instead of recording a sinusoidal undulation having a single upr frequency, the recorded undulation will have a upr frequency that varies sinusoidally with the rotary position of the encoding disc 20 at a beat frequency of 1 upr.

A method of characterising and correcting for the eccentricity of an encoder 20, 22 will now be described with reference to FIG. 10 which is a flow chart illustrating processes carried out by the data processor 150.

Measurement of the Multiwave Standard

It is assumed that the centring and levelling turntable 16 support assembly has already been precisely positioned on the base 5. Therefore, initially a set up procedure comprising a cresting/crowning process is carried out to align the axis of rotational symmetry of the waviness standard 14 to the axis of rotation of the turntable 16 (indicated by dashed line A-A in FIG. 1).

Once the set up procedure has been completed, the operator instructs (via the keyboard 122 and/or the pointing device 123) the control apparatus of the metrological instrument to cause a measurement procedure to be carried out on the waviness standard 14. As the turntable 16 rotates the waviness standard 14 relative to the stylus tip 12, the stylus tip follows the surface form of the waviness standard 14 and the r displacement provider 135 provides to the DAPU 130 measurement data representing the surface form of the waviness standard 14, that is, the change in r displacement of the stylus tip 12 with $\alpha$.

At S1 in FIG. 10, the data receiver 151 of the data processor 150 receives the measurement data from the DAPU 130. The controller 159 causes this data to be stored by the data storer 152 so that, at the end of the measurement procedure, the data storer 152 stores a measurement data set representing the measurement over the measurement path.

The controller 159 then causes the output provider 158 to advise the user via the display 121 that the measurement has been completed. In this example, the operator then instructs (via the keyboard 122 and/or pointing device 123) the control apparatus 3 of the metrological instrument 1 to cause a characterisation process to be run to characterise the eccentricity of the encoder. At this point, the controller 159 may also cause the output provider 158 to display the results of the measurement upon the display, for example in the format of FIG. 8.

Characterisation of Encoder Eccentricity

To analyse the component of the measured data due to eccentricity of the encoder disc 20, at S2 in FIG. 10, the data multiplier 154 of the data processor 150 multiplies the measurement data by $\sin(\beta)$, where $\beta$ is the upr frequency (150 upr in this example) of the series of undulations on the multiwave standard work piece 16 about which analysis is to be performed. As the measured data contains a component centred about $\beta$ but spread out in sidebands due to the eccentricity of the encoder disc, the component of the measured data due to the 150 upr undulations may be represented by the sum of the sidebands $\Sigma \sin(\beta+x)$ with the difference between $\Sigma \sin(\beta+x)$ and $\sin(\beta)$ being due to the eccentricity of the encoder disc 20. Accordingly, using the formula $\sin(A)\sin(B)=\frac{1}{2}(\cos(A-B)-\cos(A+B))$, multiplication of the component of the measured data due to the 150 upr undulations by $\sin(\beta)$ produces first multiplied data of the form $\frac{1}{2}\Sigma(\cos(x)+\cos(2\beta+x))$. The first multiplied data thus has a low frequency component representing the contribution to the measurement data due to the eccentricity of the encoder disc 20 (the $\cos(x)$ terms), and a higher frequency component (the $\cos(2\beta+x)$ terms). At S3 of FIG. 10, the data filterer 155 performs a filtering operation to remove the high frequency components of the first multiplied data so as to leave only the contribution to the measurement data due to the eccentricity of the encoder disc 20—the $\frac{1}{2}\Sigma \cos(x)$ component.

At S4 of FIG. 10 the data multiplier 154 of the data processor 150 multiplies the measurement data by $\cos(\beta)$ to produce second multiplied data of the form $\frac{1}{2}\Sigma(-\sin(x)+\sin(2\beta+x))$. At S5 of FIG. 10, the data filterer 155 performs a filtering operation to remove the high frequency components of the second multiplied data so as to leave only the contribution to the measurement data due to the eccentric encoder disc 20—the $\frac{1}{2}\Sigma-\sin(x)$ component.

At S6 of FIG. 10, the beat frequency analyser 156 divides the filtered second multiplied data by the filtered first multiplied data before performing an arctan operation on the results of the division. As $\arctan(\sin(A)/\cos(A))=A$, the results of the arctan operation provide eccentricity data representing the isolated contribution to the measurement data due to the eccentricity of the encoder disc 20. Advantageously, by dividing the filtered second multiplied data by the filtered first multiplied data, no prior information about the amplitude of the undulations is required when determining encoder eccentricity.

FIG. 11 shows a plot of $\alpha-\theta$ as produced by the above described operation when performed on the measurement data shown in FIG. 8. As can be seen, the eccentricity data of FIG. 11 is sinusoidal with the peak amplitude value corresponding to k and the phase corresponding to $\psi$. To determine k and $\psi$ for the eccentricity data, at S7 of FIG. 10 the parameter identifier 160 fits a sine wave to the eccentricity data using an optimisation algorithm—in this case a least squares fitting algorithm—although a person skilled in the art will recognise that a number of different approaches could be used to determine k and $\psi$ from the eccentricity data. The parameter identifier 160 then causes the determined values of k and $\psi$ to be stored in storage 114.

Measurement and Correction of Data

Once parameters k and $\psi$ have been identified by the parameter identifier 160, measurement data can be acquired and corrected as follows.

It is assumed that the centring and levelling turntable 16 support assembly has already been precisely positioned on the base 5. Therefore, initially a set up procedure comprising a cresting/crowning process is carried out to align the axis of rotational symmetry of the waviness standard 14 to the axis of rotation of the turntable 16 (indicated by dashed line A-A in FIG. 1).

Once the set up procedure has been completed, the operator instructs (via the keyboard 122 and/or the pointing device 123) the control apparatus of the metrological instrument to cause a measurement procedure to be carried out on the waviness standard 14. As the turntable 16 rotates the waviness standard 14 relative to the stylus tip 12, the stylus tip follows the surface form of the waviness standard 14 and the r displacement provider 135 provides to the DAPU 130 measurement data representing the surface form of the waviness standard 14, that is, the change in r displacement of the stylus tip 12 with a along the measurement path.

At S8 of FIG. 10, measured angles $\alpha$ are corrected to determine the corresponding true angle $\theta$ of the turntable 16 for each measurement position. To do this, the data corrector 161 iteratively solves $\alpha=\beta-\sin(\theta-\psi)$ using, in this case, a least squares optimisation algorithm, with the values of k and $\psi$ set to be those identified by the parameter identifier 160. Although $\theta$ may subsequently be calculated every time a given angle $\alpha$ is measured, to improve efficiency a lookup table may be populated with $\theta$'s corresponding to all possible measured $\alpha$'s and saved in storage 114. To avoid the need to calculate $\theta$ for all possible measured $\alpha$'s, preferably $\theta$ is calculated only for a regularly spaced subset of all possible measured $\alpha$'s and cubic spline interpolation is used to interpolate intermediate values—preferably at radially equispaced locations.

Once the data corrector 161 has corrected the measured angles, the controller 159 may instruct the data pre-conditioner 153 to pre-condition the data by, for example, filtering to remove noise or variations due to environmental conditions or contamination. In this embodiment, an alternating sequence ball filter is used to suppress asperities. As thus described, the filter is a software filter implemented by the data processor. The filter may, however, be implemented in hardware within the DAPU 130 before the data is supplied to the control apparatus 3, in which case the data pre-conditioner shown in FIG. 4 will be omitted.

Modifications and Variations

A person skilled in the art will appreciate that, although the above describes determination of the contribution to the measured data caused by the eccentricity of the encoder disc by way of multiplications by $\sin(\beta)$ and $\cos(\beta)$ and an arctan operation, other mathematically equivalent or similar operations may be performed to isolate this contribution.

As one possibility, instead of multiplying the measurement data by sin and cos terms before performing an arctan operation so as to identify parameters k and $\psi$, parameters k and $\psi$ could be determined using an optimisation process to fit the theoretical form of the multiwave standard as modified by estimated values of k and $\psi$ to the measured data.

As another possibility, instead of determining parameters k and $\psi$ based upon an analysis of a single upr frequency on a multiwave standard, analysis could be performed upon a number of upr frequencies before bringing the intermediate parameters k and $\psi$ as determined for each upr frequency together, for example by way of an averaging operation. A person skilled in the art will recognise other ways of performing beat frequency analysis, for example alternative methods of analysing heterodyned signals.

A person skilled in the art will appreciate that, once parameters k and $\psi$ have been determined, measurements need not be taken and corrected immediately. For example, parameters k and $\psi$ could be determined by a supplier of the metrological instrument 1 and stored in storage 114 prior to delivery of the metrological instrument to an end user.

A person skilled in the art will appreciate that, although the above has described the use of a waviness standard having a series of radial undulations arranged so, that when the waviness standard is rotated about its axis of symmetry and a radial measurement of the undulations is taken, a sinusoidally undulating signal is recorded, the herein described techniques could equally be employed with any artefact having any other kind of undulating, oscillating, rough, textured, toothed, wavy, rippled, serrated, indented, corrugated, knurled, etc. surface. For example, the waviness standard may have square or saw-toothed undulations. Preferably however, the waviness standard has radially sinusoidal undulations. Even more preferably, the radially sinusoidal undulations are superposed on a circular cross section of the waviness standard.

Preferably, the waviness standard has an integer number of undulations about its periphery so as to avoid rotational discontinuities—accordingly, when a radial measurement of a sinusoidally undulating surface of a waviness standard is taken during a single revolution of the turntable, the resultant measurement profile comprises an integer number of sine waves.

A person skilled in the art will appreciate that, although the above has described using a waviness standard 14 having a plurality of bands 24, 26 having undulations, the waviness standard may simply have one band. They will also appreciate that, although the above has described the correction of encoder disc eccentricity by way of measuring a multiwave standard work piece, a work piece having a single frequency of undulations could equally be employed.

Although the above has described a rotary encoder comprising a glass encoding disc and an array of photo-transducers, a person skilled in the art will appreciate that the above-described methods may equally be applied to other types of encoders—such as an optical encoder having an opaque encoding disc with one or more holes or notches, an electro-mechanical rotary encoder, a Hall effect encoder, etc. As one possibility, the detecting component of the rotary encoder could be coupled to the turntable and the encoding component of the rotary encoder could be coupled to the base 5.

A person skilled in the art will appreciate that, although the above describes initially performing a set up procedure comprising a cresting/crowning process to align the axis of rotational symmetry of the waviness standard 14 to the axis of rotation of the turntable 16, this step could be omitted and instead performed in software—for example as set out in U.S. Pat. No. 5,926,781, the whole contents of which are hereby incorporated by reference.

A person skilled in the art will appreciate that, although the above description of the present invention has been described with reference to a mechanical stylus for measurement of a surface profile, other types of measurement probe, for example non-contact probes such as the laser triangulation probe supplied by Taylor Hobson in the Talysurf CLI product, may equally be employed.

A person skilled in the art will appreciate that the techniques described herein could be performed in multiple stages by different parties who may be located in different jurisdictions. For example, measurement of the rotational position of the turntable and of the undulating profile of the work piece may be performed by a first party in a first jurisdiction. The first party may then send the measurement information to a second party in a second jurisdiction for characterisation of the eccentricity of the rotary encoder before the second party sends the results of the characterisation back to the first party.

A person skilled in the art will appreciate that, although the above has described determining the eccentricity of a rotary encoder with respect to an axis of rotation of a turntable, the techniques and apparatus described herein could equally be employed for determining the eccentricity of an axis of rotation of a turntable with respect to a rotary encoder.

A person skilled in the art will appreciate that, although the above has been described with reference to a rotary encoder that reads the encoded rotary position at a single radial distance R, the techniques described herein could equally be applied to rotary encoders that read encoded rotary positions at a plurality of radial distances.

As one possibility, when eccentricity determination is carried out using a multiwave standard, the values of k and $\psi$ may be evaluated for more than one of the undulation frequencies of the standard. The resulting k and $\psi$ values may then be compared or combined, for example by averaging, to provide improved estimates of k and $\psi$.

As one possibility, a particular waviness standard (a master or mother waviness standard) could be employed with any of the above described methods to determine rotary encoder eccentricity for each of a plurality of measurement machines. Each machine's determined encoder eccentricity could then be used to correct for measurements taken using the respective machine. The use of a single master waviness standard to determine, and correct for, encoder eccentricity for a plurality of machines means that any errors in the determination process that arise from imperfections in the master standard are mapped consistently to all machines thereby improving the transferability of measurements taken on the different machines. If instead a different waviness standard was used to correct for the encoder eccentricity of each machine, each waviness standard would introduce a different error due its own imperfections thereby reducing the transferability of measurements taken on the different machines.

As one possibility, there is provided a computer program, computer program product, computer readable medium, or signal, comprising computer program instructions to cause a programmable computer to carry out any one or more of the methods described herein.

Various features described above may have advantages with or without other features described above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of characterising an eccentricity of a rotary encoder of a surface measurement instrument, the method comprising:
   effecting relative rotation of a work piece support and a measurement probe, wherein the rotation is effected about a rotation axis and the work piece support supports an artefact having an undulating profile;
   using a rotary encoder to log, about a measurement axis of the rotary encoder, the rotation,
   wherein the measurement axis of the rotary encoder has an eccentricity with respect to the rotation axis;
   measuring, using the measurement probe, the undulating profile of the artefact at a plurality of rotational positions of the work piece support with respect to the measurement probe to produce profile measurement data; and extracting, by a processing unit, from the profile measurement data parameters describing the eccentricity of the measurement axis of the rotary encoder with respect to the rotation axis.

2. The method of claim 1 wherein the rotary encoder comprises a first portion coupled to the work piece support, and a second portion rotatable with respect to the first portion, wherein at least one of the first and second portions includes a detecting device and method further comprises using the detecting device to detect relative rotation of the first portion of the rotary encoder with respect to the second portion of the rotary encoder about the measurement axis of the rotary encoder.

3. The method of claim 1, wherein the extracting step comprises performing a beat frequency analysis by the processing unit, wherein the beat frequency analysis comprises extracting, by the processing unit, from the profile measurement data at least one component due to the eccentricity of the measurement axis of the rotary encoder with respect to the rotation axis.

4. The method of claim 3, wherein the undulating profile of the artefact comprises a component that undulates at a frequency β.

5. The method of claim 4, wherein the extracting step comprises at least one of:
multiplying, by the processing unit, the profile measurement data by sin(β) to produce first multiplied data; and filtering the first multiplied data to produce first filtered data; and
(ii) multiplying, by the processing unit, the profile measurement data by cos(β) to produce second multiplied data; and filtering the second multiplied data to produce second filtered data.

6. The method of claim 4, wherein the extracting step comprises:
multiplying, by the processing unit, the profile measurement data by sin(β) to produce first multiplied data; and
filtering, by the processing unit, the first multiplied data to produce first filtered data;
multiplying, by the processing unit, the profile measurement data by cos(β) to produce second multiplied data;
filtering, by the processing unit, the second multiplied data to produce second filtered data;
dividing, by the processing unit, the second filtered data by the first filtered data;
performing, by the processing unit, an arctan operation on the results of the division; and
determining, by the processing unit, the parameters from the results of the arctan operation.

7. The method of claim 6, wherein the determining the parameters from the results of the arctan operation step comprises fitting a sine wave to the results of the arctan operation step and determining the amplitude and the phase of the fitted sine wave.

8. The method of claim 1, further comprising determining, by the processing unit, for an angle α measured about the measurement axis of the rotary encoder, a corresponding angle θ measured about the rotation axis.

9. The method of claim 8, wherein the determining θ step comprises solving the equation $\alpha=\theta-\sin(\theta-\psi)$, where k and ψ are the produced parameters.

10. The method of claim 8, comprising determining, by the processing unit, a plurality of angles θ for a corresponding plurality of angles α.

11. The method of claim 10, further comprising interpolating, by the processing unit, between two or more of the angles θ to produce at least one intermediate angle θ.

12. The method of claim 1, wherein the undulating profile of the artefact undulates sinusoidally.

13. The method of claim 1, wherein the undulating profile of the artefact comprises undulations at a plurality of frequencies.

14. The method of claim 1, wherein the extracting step comprises producing the parameters by determining intermediate parameters for each of the rotational frequencies before combining the intermediate parameters.

15. The method of claim 1, wherein the extracted parameters form a first set of parameters, and further comprising:
effecting relative rotation of the work piece support and the measurement probe, wherein the rotation is effected about the rotation axis and the work piece support supports the artefact having an undulating profile;
using the rotary encoder to log, about the measurement axis of the rotary encoder, the rotation;
measuring, using the measurement probe, the undulating profile of the artefact at a further plurality of rotational positions of the work piece support with respect to the measurement probe to produce further profile measurement data;
extracting, by the processing unit, from the profile measurement data a further parameter set describing the eccentricity of the measurement axis of the rotary encoder with respect to the rotation axis; and
averaging, by the processing unit, each parameter across the first and further parameter set to produce an improved set of parameters.

16. A method of characterising an eccentricity of a rotary encoder of a surface measurement instrument, the method comprising:
measuring, using a measurement probe, an undulating profile of an artefact carried on a work piece support at a plurality of rotational positions determined by logging, about a measurement axis of a rotary encoder, relative rotation about a rotation axis, of the work piece support with respect to the measurement probe, wherein the measurement axis of the rotary encoder has an eccentricity with respect to the rotation axis;
receiving the profile measurement data by a processing unit; and
extracting, by the processing unit, from the profile measurement data parameters describing the eccentricity of the measurement axis of the rotary encoder with respect to the rotation axis.

17. A tangible non-transitory storage medium carrying program instructions for programming transforming means to carry out a method in accordance with claim 1.

18. The method of claim 8 wherein the determining θ step is based on fitting a sinusoid to the undulating profile to extract the parameters.

* * * * *